United States Patent
Roth

(10) Patent No.: US 8,499,070 B2
(45) Date of Patent: Jul. 30, 2013

(54) ELECTRONIC DEVICE AND METHOD FOR MONITORING COMMUNICATION WITHIN A NETWORK

(75) Inventor: Daniel Roth, Remshalden (DE)

(73) Assignee: Sony Corporation, Tokyo (JP)

( * ) Notice: Subject to any disclaimer, the term of this patent is extended or adjusted under 35 U.S.C. 154(b) by 401 days.

(21) Appl. No.: 12/367,815

(22) Filed: Feb. 9, 2009

(65) Prior Publication Data

US 2009/0248859 A1 Oct. 1, 2009

(30) Foreign Application Priority Data

Mar. 31, 2008 (EP) .................................... 08153758

(51) Int. Cl.
*G06F 15/173* (2006.01)

(52) U.S. Cl.
USPC .......................................... 709/224; 370/401

(58) Field of Classification Search
USPC .......................................... 709/224; 370/401
See application file for complete search history.

(56) References Cited

U.S. PATENT DOCUMENTS

| | | | |
|---|---|---|---|
| 4,680,753 A * | 7/1987 | Fulton et al. ................... | 370/449 |
| 6,839,717 B1 * | 1/2005 | Motoyama et al. ........... | 709/224 |
| 8,307,074 B1 * | 11/2012 | Martin et al. .................. | 709/224 |
| 2003/0084176 A1 * | 5/2003 | Tewari et al. .................. | 709/230 |
| 2004/0267924 A1 | 12/2004 | Yang et al. | |
| 2005/0078692 A1 * | 4/2005 | Gregson ......................... | 370/401 |
| 2005/0138117 A1 * | 6/2005 | Chaney et al. ................. | 709/203 |
| 2005/0144240 A1 * | 6/2005 | Mrsic-Flogel et al. ........ | 709/206 |
| 2005/0240835 A1 * | 10/2005 | Dragnea et al. ................. | 714/47 |
| 2005/0262202 A1 * | 11/2005 | Motoyama et al. ............ | 709/206 |
| 2006/0031476 A1 * | 2/2006 | Mathes et al. ................. | 709/224 |
| 2006/0256187 A1 * | 11/2006 | Sheldon et al. ............ | 348/14.01 |
| 2007/0083667 A1 * | 4/2007 | Cooper ......................... | 709/231 |
| 2008/0016162 A1 * | 1/2008 | Meentzen et al. ............ | 709/206 |
| 2008/0222687 A1 * | 9/2008 | Edry .............................. | 725/105 |
| 2008/0310641 A1 * | 12/2008 | Park ................................ | 381/59 |

FOREIGN PATENT DOCUMENTS

| | | |
|---|---|---|
| EP | 1 715 629 A1 | 10/2006 |
| WO | WO 00/28698 | 5/2000 |

* cited by examiner

*Primary Examiner* — Wing F Chan
*Assistant Examiner* — Razu Miah
(74) *Attorney, Agent, or Firm* — Oblon, Spivak, McClelland, Maier & Neustadt, L.L.P.

(57) ABSTRACT

An electronic device includes a communication component that connects the electronic device to a network and that enables the electronic device to communicate within the network. The electronic device also includes a listening unit connected to the communication component that monitors messages transmitted over the network. The electronic device includes a processing unit that determines a type of at least one monitored message. The electronic device also includes an output means for outputting at least a part of the monitored messages depending on the determined type.

26 Claims, 4 Drawing Sheets

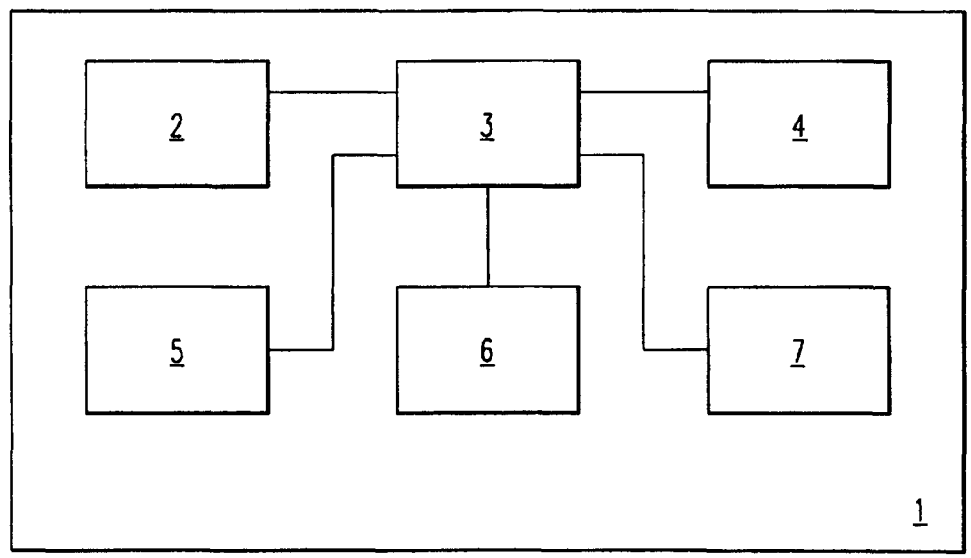
Fig. 1
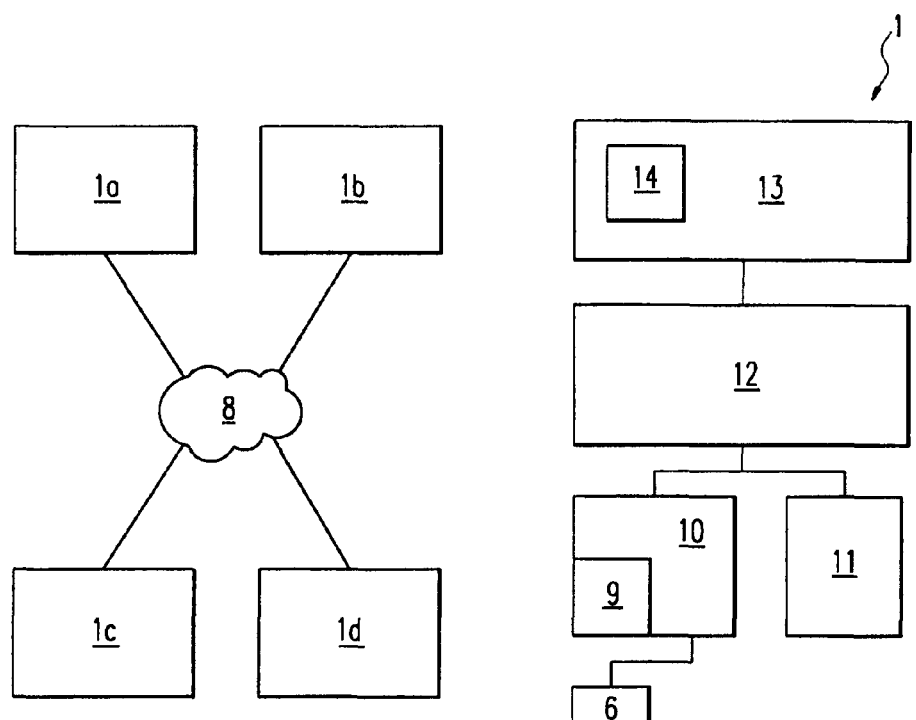
Fig. 2
Fig. 3

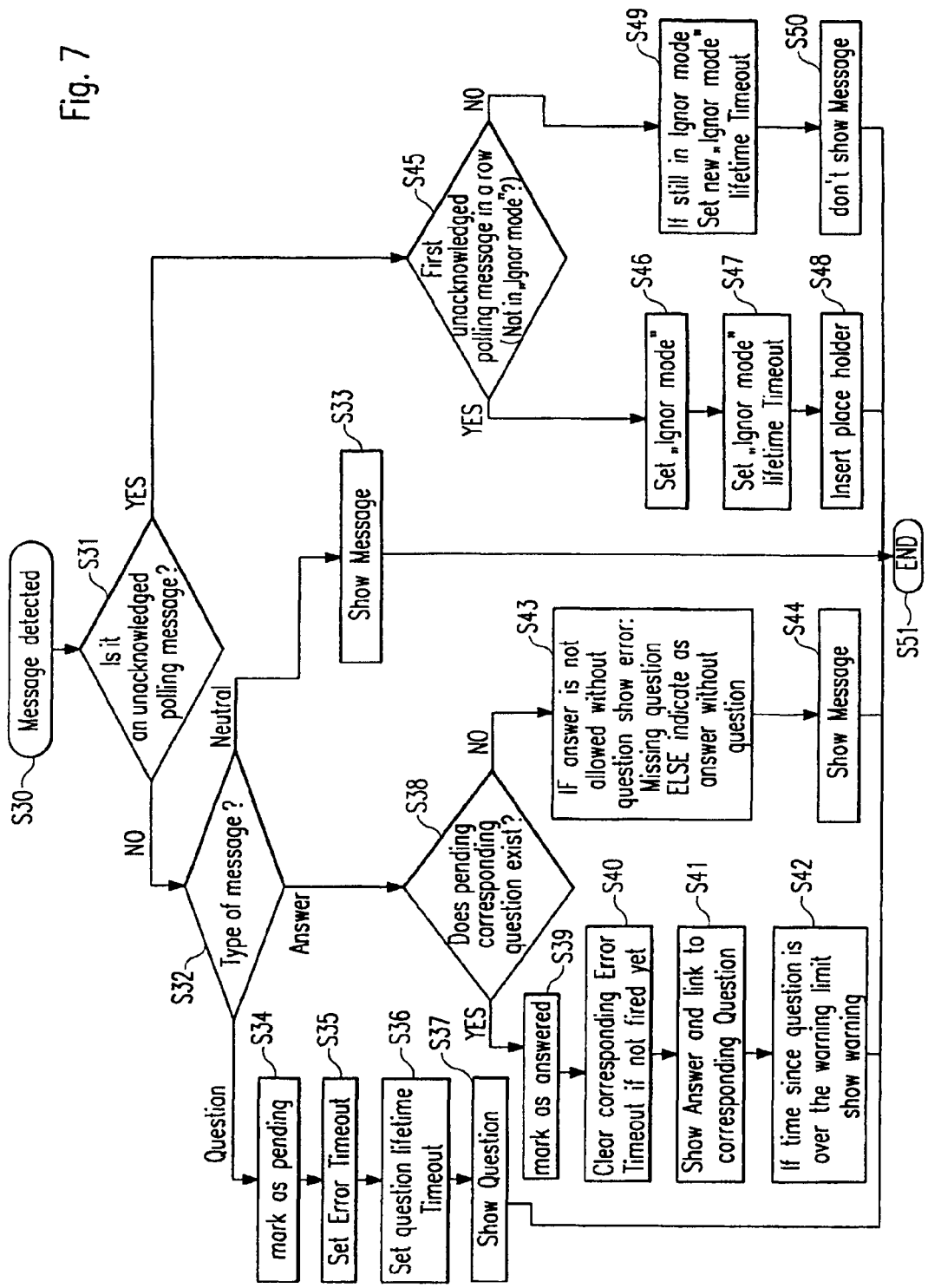

ELECTRONIC DEVICE AND METHOD FOR MONITORING COMMUNICATION WITHIN A NETWORK

BACKGROUND

The present invention relates to an electronic device and to a method for monitoring communication within a network. Specifically, the present invention relates to the field of monitoring communication within a network and processing the monitored messages in a specific way.

Electronic devices are used in a wide field of applications. Such devices may for example be a personal computer, a television, a video recorder, a DVD recorder, facsimile devices, digital cameras, mobile terminals for wireless communication or the like. An important task in developing electronic devices is to simplify the handling, ensure the functionality and to make the handling more convenient.

Specifically when connecting several electronic devices within a network it may happen that certain functions do not work properly. This can have several reasons, e.g. a software bug, a hardware bug, software incompatibility or a wrong set-up. In the case of a software bug one or more devices do not work properly together although all of them passed the compliance test. In the case of a hardware bug errors may occur only depending on a special set-up. Software incompatibility may specifically arise after updating the software of a device. Further, a lot of communication traffic arises when connecting several electronic devices within a network, which makes it difficult to filter out the important pieces of information.

It is therefore the objective problem of the present invention to overcome the disadvantages of the prior art. Specifically, it is the objective problem of the present invention to provide an electronic device and a method within a network enabling a simplified and more convenient handling.

This object is solved by means of the independent claims.

SUMMARY

The present invention relates to an electronic device comprising a communication component for connecting the electronic device to a network and for enabling communication of the electronic device within the network, a listening unit connected to the communication component for monitoring messages transmitted over the network, a processing unit for determining the type of the monitored message and an output means for outputting at least a part of the monitored messages depending on the determined type.

The present invention further relates to a method for monitoring communication within a network comprising the steps of providing a listening unit for monitoring messages transmitted over the network, monitoring the communication transmitted over the network, determining the type of monitored messages by a processing unit and outputting by an output means at least a part of the monitored messages depending on the determined type.

Preferably, the communication component is a hardware interface.

Alternatively, the communication component is a bus.

Preferably, the communication component is adapted to enable communication via the consumer electronics control CEC standard.

Preferably, the output means is a display.

Alternatively, the output means is an interface enabling communication with a further remote device.

Advantageously, the listening unit is adapted to monitor communication traffic according to the consumer electronics control CEC standard.

Preferably, the processing unit is adapted to detect an unacknowledged polling message.

Preferably, the processing unit is adapted to determine whether the unacknowledged polling message is the first unacknowledged polling message in a row.

Advantageously, the output means is adapted to output a placeholder in case the unacknowledged polling message is the first unacknowledged polling message in a row.

Further, advantageously, the output means is adapted not to output the unacknowledged polling message in case the unacknowledged polling message is not the first unacknowledged polling message in a row.

Preferably, the processing unit is adapted to detect a question.

Further, preferably, the processing unit is adapted to define a question lifetime timeout after which output means marks the question as unanswered.

Advantageously, the output means is further adapted to output an error message in case of an unanswered question.

Preferably, the processing unit is adapted to detect an answer.

Further, preferably, the processing unit is adapted to detect whether an answer belongs to a previous question.

Advantageously, the output means is adapted to mark a question and an answer as belonging together.

Further, advantageously, the output means is adapted to mark belonging together questions and answers differently depending on the time passed between the question and answer.

Preferably, the processing unit is adapted to detect an answer without corresponding question.

Advantageously, the output means is adapted to mark an answer without corresponding question and/or to output an error message indicating that the answer has no corresponding question.

The present invention will be explained in more detail in the following description of preferred embodiments in relation to the enclosed drawings in which

BRIEF SUMMARY OF THE DRAWINGS

FIG. 1 shows a schematic block diagram of an electronic device according to the present invention, FIG. 2 shows a schematic block diagram of a network according to the present invention, FIG. 3 schematically shows a block diagram of the different components and layers according to the present invention, FIG. 7 is a flow chart showing the second embodiment of a method for monitoring communication according to the present invention.

DETAILED DESCRIPTION

Figure 4A:
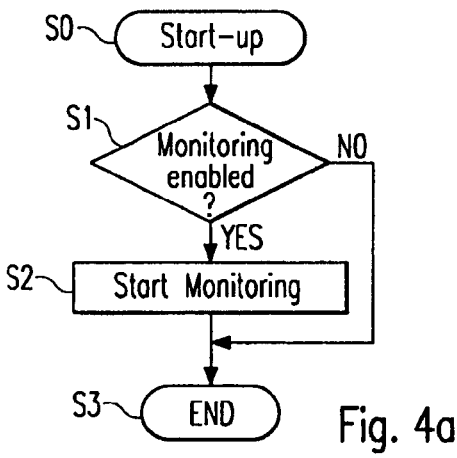
FIGS. 4a and 4b are flow charts showing the main process steps according to a method for monitoring communication according to the present invention.

FIG. 1 is a schematic block diagram showing the elements of an electronic device 1 according to the present invention.

The electronic device 1 comprises an output means 2 for outputting data and/or information to a user or to further devices. The output means 2 herefore may be a display, a loudspeaker, an interface for outputting data and/or information to other devices via a cable or wireless connection, whereby said other devices may be a printer, a computer, a video or DVD recorder, a television or a remote device which is reached over the internet or via any other wired or wireless connection.

The electronic device 1 further comprises an input means 5 for enabling input of data and/or information either by a user or by a further device. The input means may be a keyboard, a mouse, a touchpad, recognition of speech means, an interface for cabled or wireless connection to another device or for inputting information or selecting applications or programs, e.g. via infrared (IR) signals sent by a remote controller.

The electronic device further comprises a memory 4 for temporally or permanently storing data, information, programs, applications and the like. The memory 4 hereby may be divided into different memory spaces each providing different types of memory, for example a random access memory RAM, a flash memory or other types. Specifically, the electronic device 1 may store log files or the like in the memory 4 which then can be accessed by a remote device via the input means 5 and the output means 2 in case those means enable a wired or wireless connection to the remote device. This has the advantage that every testing procedure can be accomplished remotely and that also most services can be accomplished by remote control. The customer therefore does not have to bring the electronic device 1 to a vendor or service provider and the service provider does not have to send service personnel to the customer but can remotely accomplish error diagnosis, testing procedure or the like.

The electronic device further comprises a power source 7 which may be batteries, a rechargeable battery pack or a connection to the electricity network or to another device from which power may be submitted to the electronic device 1.

The electronic device 1 further comprises a processing unit 3 connected to the output means 2, input means 5, memory 4 and power source 7 and being in data communication with above-said components. The processing unit 3 hereby controls and supervises the transmission and reception of data and/or information within the electronic device 1. The processing unit 3 further supervises the operation of the electronic device 1. The processing unit 3 may comprise a single processing part or consist of several processing parts, e.g. the processing unit 3 can comprise a multi processor architecture.

Further, a communication component 6 within the electronic device 1 is provided which serves for connecting the electronic device 1 to a network and enables communication of the electronic device within the network. The communication component 6 can be a hardware interface and in a specific embodiment may be a bus.

Additionally a listening unit 9 (not shown in FIG. 1) is provided enabling the electronic device 1 to monitor the whole communication traffic within the network to which the electronic device 1 is connected via the communication component 6. The listening unit 9 is hereby adapted to only listen to the communication traffic and to monitor the communication traffic but not to send any messages or commands.

FIG. 2 shows a schematic block diagram of a network comprising several electronic devices 1. Hereby, several electronic devices 1*a*, 1*b*, 1*c* and 1*d* are connected to each other over a network 8. Each of the electronic devices comprises a communication component 6 enabling the communication within the network 8. The network 8 may hereby be a wired or wireless network basing on RS232, USB, Ethernet or any other low range, midrange or long distance range communication standard. In a specific embodiment according to the present invention the network 8 bases on the consumer electronics control (CEC standard).

The communication component 6 in the specific embodiment is a CEC bus and enables the devices 1*a*, 1*b*, 1*c* and 1*d* to communicate on CEC standard basis within the network 8.

FIG. 3 is a schematic block diagram showing the components and layers according to a possible embodiment of the present invention. All these components form an embedded system within the electronic device 1 which has the advantage, that no further device has to be provided. As already explained the electronic device 1 comprises a communication component 6. Connected to the communication component 6 is a driver 10 for enabling operation of the communication component 6 and adapted to enable all kinds of operation necessary for operating the communication component 6. According to one possibility the communication component 6 is a hardware interface and the driver 10 is the corresponding software for enabling operation of the communication component 6. Within the same level of the driver 10 a remote transmission component 11 can be provided thereby enabling data transmission to remote devices for example via a USB connection, the web or the like.

In the possible implementation as shown in FIG. 3 on the highest level an application unit 13 is provided providing applications and application programs to the user thereby allowing the user to operate the electronic device 1. As connection between the lowest layer comprising the driver 10 and the highest layer comprising the application unit 13 a middleware unit 12 can be provided. Alternatively, the middleware unit 12 can also be omitted and the respective functionalities can be embodied in the application unit 13 or the lowest level or can be split between the two levels.

Additionally according to the present invention the driver 10 further comprises a listening unit 9 which is adapted to listen to the communication within the network 8 over the communication component 6 and thereby monitoring the communication transmitted over the network. The listening unit 9 is hereby only adapted to listen and to monitor but is not able to send commands or data or any other messages via the communication component 6. The listening unit 9 and the driver 10 can be separate components or can be embodied into one single component.

In a further possibility within the application unit 13 a service menu application 14 can be provided comprising programs or comprising a single program enabling a user or service personal to access the electronic device 1 in case of a required service or error connection. The service menu application 14 can also be omitted and the respective functionalities can be imbedded in the application unit 13.

The service menu application 14 can be directly linked to the listening unit 9 so that the communication and data monitored by the listening unit 9 within the network 8 is directly transferred to the service menu application 14 or to the application unit 13 in case that no service unit application 14 is provided. Alternatively, the data regarding the monitored messages can also be passed through the middleware unit 12 from the listening unit 9 to the service application menu 14. In any case the service menu application 14 or the application unit 13 gets data about the monitor traffic by the listening unit 9 so that the received data can be further processed and shown.

The layer structure which was described with reference to FIG. 3 is intended to represent only one possible example of an implementation of the listening unit 9. The present invention is not limited to the described implementation and layer structure but encompasses any other possible structure. It is for example possible to provide the above described components either as hardware components with a specific functionality or as software components enabling execution of specific applications, programs or steps. Further, all components can also be provided as one single module or different components can form one module. In case that for every function or component a single module it is provided, this has the advantage that single modules can be easily changed or amended without affecting the other components. In any case the components are embedded in the electronic device 1. The functionalities accomplished by the middleware unit 12 and the application unit 13 in the following are described generally as functionalities carried out by the processing unit 3.

According to the main idea of the present invention in addition to providing a communication component 6 enabling communication of the electronic device 1 within a network 8 a further component, namely a listening component 9 is provided which in addition to the communication on the network 8 enables the electronic device 1 to monitor the whole traffic over the bus and the network and thereby without participating in the communication to monitor the whole traffic within the network 8, i.e. all the messages that come from the other devices within the network 8 or that are sent by the other devices within the network 8 including messages sent and received by the electronic device 1 itself. Additionally according to the main idea of the present invention, the monitored traffic is output by the output means 2 in an intelligent way, i.e. the output means 2 outputs different types of traffic in different ways, in order to enable a better and faster understanding of the traffic within the network.

Hereby, the output means 2 can output only a part of the monitored messages depending on the actual requirements. In case where for example only polling messages are interesting, all other types of messages are not output. Alternatively or additionally the output means 2 can output placeholders or general denominations instead of outputting the message itself. For example the output means 2 can simply output neutral messages, i.e. several different messages in case those messages in the present case are not of interest. Alternatively, in the case of a message being of no interest, these neutral messages can also be greyed out or filtered out. The output means 2 further can mark the output messages in different ways, e.g. with different colours, formats or the like. Additionally, the output means 2 in addition to the monitored messages can output further indications such as error messages or the like.

As will be explained in the following this basic idea has many different applications and advantages. The present invention in its main principals is explained in FIGS. 4a and 4b. If there is a lot of traffic within the network 8 and on the bus, filters can help to see only the necessary data. The present idea will be sometimes explained with reference to the CEC communication standard but can be applied to any other type of communication standard, e.g. AV link or other.

The steps for starting the monitoring, i.e. for activating the listening unit 9 are shown in FIG. 4a. The process starts in step S0 for example with switching on the electronic device 1. In the next step S1 the electronic device 1 checks whether the monitoring is enabled by user settings. These settings can be input directly or via a remote device. In case that no monitoring is enabled then only this process ends in step S3. The normal operation of the electronic device 1 continues without the monitoring feature. Otherwise, if in step S2 it is detected that monitoring is enabled, then the monitoring via the listening unit 9 is started and this process then also ends in step S3 and in this case the normal operation of the electronic device 1 continues with the monitoring feature.

Figure 4B:
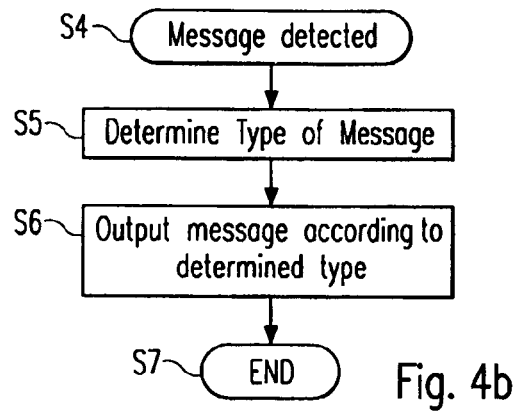

FIG. 4b shows the main steps according to the method of the present invention for monitoring messages. The process as shown in FIG. 4b starts in step S4 with a detected message, i.e. the listening unit 9 has monitored a message transmitted within the network 8. The listening unit 9 transmits the monitored message to the processing unit 3, where it is further processed. In the next step S5 it is determined which type of message has been monitored. In the further step S6 the command or the message is handled according to the previously determined type, i.e. depending on the type of the message which has been monitored by the listening unit 9 the message is processed in a different way. Specifically, the monitored message is output by the output means 2 in a specific way depending on the type of the message. This process ends in step S7. If another message is detected by the listening unit 9, this process will start again with step S4.

Figure 5:
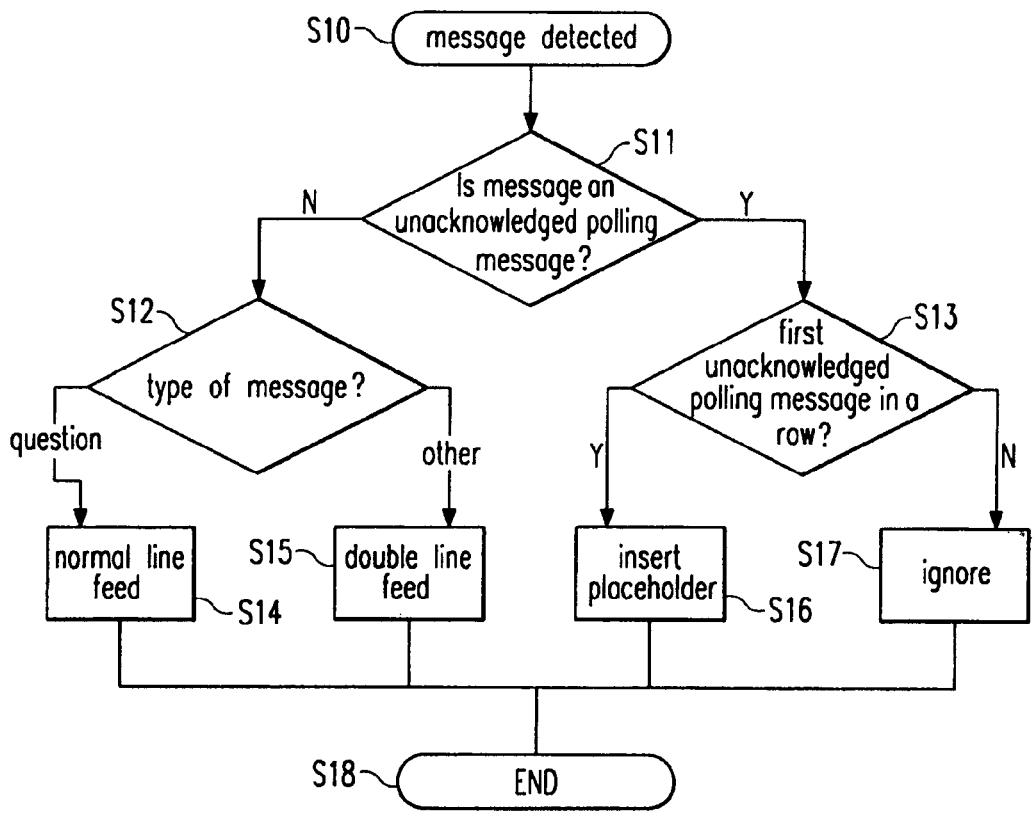
FIG. 5 is a flow chart showing a first embodiment of a method for monitoring communication according to the present invention.

FIG. 5 shows a first embodiment of the main process as explained with reference to FIGS. 4a and 4b. FIG. 5 shows the process in a general case but can also be adapted to networks where the communication bases on the CEC communication standard. On a CEC bus or generally speaking in any type of network there can be many polling messages to track for determining whether devices are present or not. Depending on the number of polling messages filtering can help to simplify the handling and to keep the overview.

This is achieved with the process as schematically shown in FIG. 5. The process starts in step S10 with the detection of a message by the listening unit 9.

In the next step S11 it is checked whether the monitored message is an unacknowledged polling message. A polling message within the CEC standard is hereby a sort of a ping. If this is the case it is further checked in step S13 if this polling message is the first unacknowledged polling message in a row. If this is also the case then on the output means which in this case may be a display a placeholder is inserted between the shown messages in step S16.

Otherwise if in step S13 it is determined that the unacknowledged polling message was not the first unacknowledged polling message in a row then in the next step S17 this message is ignored and no further processing follows.

On the other hand if in step S11 it is detected that the monitored message is not an unacknowledged polling message then in a further step S12 it is checked whether the message is a question or whether it is any other type of message. If it is a question then in the next step S14 a normal line feed is provided on the output means 2 which in this case would be a display. Otherwise, if in step S12 it is determined that the message was not a question, then in the next step S15 a double line feed is provided when outputting the messages monitored on the bus on the display. This process ends in step S18. If another message is detected by the listening unit, this process will start again with step S10.

An example for the output of the messages is given below. For enabling a better description of the output messages the lines in the following are numbered, which during normal use can also be omitted.

| | |
|---|---|
| Line 1 | Acknowledged polling message |
| Line 2 | Acknowledged polling message |
| Line 3 | . . . (placeholder for at least one unacknowledged polling message) |
| Line 4 | Question |
| Line 5 | Answer |

| | |
|---|---|
| Line 6 | |
| Line 7 | Question |
| Line 8 | Answer |
| Line 9 | |
| Line 10 | Neutral message |
| Line 11 | |
| Line 12 | Neutral message |
| Line 13 | |
| Line 14 | Question |
| Line 15 | Question |
| Line 16 | Answer |
| Line 17 | |
| Line 18 | . . . (placeholder for at least one unacknowledged polling message) |
| Line 19 | Question |

Two polling message have been sent and since they have been acknowledged they are shown on the display in lines 1 and 2. In lines 4, 7, 14, 15 and 19 the message type is a question and therefore a normal line feed is used. On the other hand, since in lines 5, 8, 10, 12 and 16 a message different from a question is shown, a double line feed is used. In addition, the placeholder of e.g. three dots . . . in lines 3 and 18 indicates that there has been at least one unacknowledged polling message. Hereby, only the first unacknowledged polling message in a row is indicated by the placeholder, following unacknowledged polling message are ignored. Neutral messages or messages of less interest are simply shown, e.g. in lines 10 and 12. Hereby, the above "neutral message" is only exemplary for any type of neutral message, such as standby or the like. With this way of outputting the messages, the user at once is able to have an overview of the messages as different types of messages are output in different ways. This approach is useful in a relaxed environment, i.e. an environment with low network traffic, where the answer of a question is normally received right after the questions. Hereby, questions and corresponding answers are automatically grouped together on the display.

In an environment with many messages it often happens that open questions are interrupted by other questions or messages. For handling monitored messages in such an environment an electronic device 1 and method according to a second embodiment can be adopted, which will be explained in the following. Hereby it is possible to keep an overview over the traffic within the network even in environments with high network traffic.

Figure 6A:
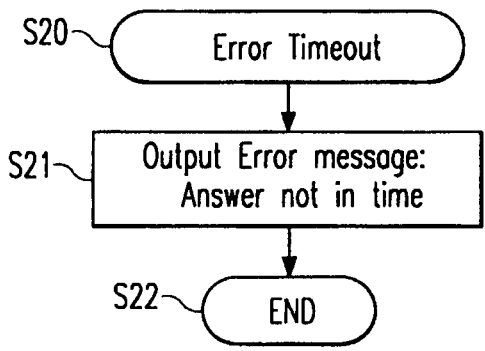
FIGS. 6a, 6b and 6c are flow charts showing process steps underlying a second embodiment of a method for monitoring communication according to the present invention.
Figure 6B:
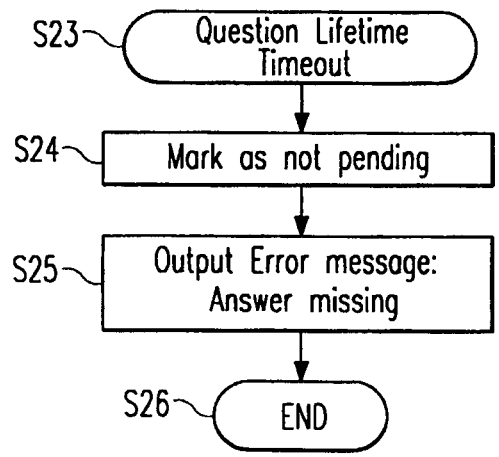
Figure 6C:
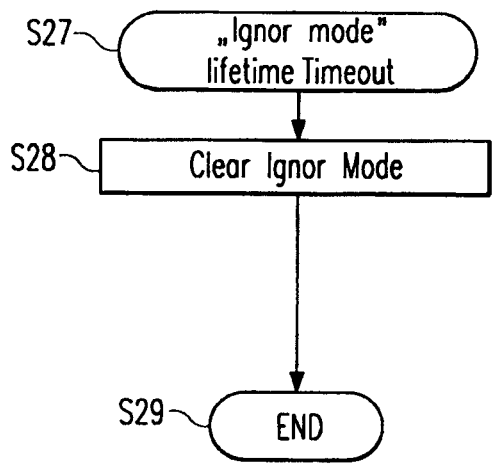

FIGS. 6a, 6b, 6c and 7 show a second embodiment of the main process as explained with reference to FIGS. 4a and 4b. FIGS. 6a to 6c hereby show some process details of the process according to the second embodiment.

The second embodiment hereby relates to the case, where numerous questions and answers are transmitted via the network 8. In this case it is important, to keep the overview, whether a question has been answered, whether an answer appears without corresponding question, whether the answer is in time or too late. Herefore, several mechanisms and definitions are adopted, which are shown in FIGS. 6a to 6c.

It is possible to define an error timeout, which means that the answer was not in time. For example it can be defined that an answer being later than 30 s after the corresponding question is too late. In case that in step S20 an error timeout occurs then in the following step S21 an error message can be output indicating that the answer has not been received in time. The process ends in step S22.

Further a question lifetime timeout can be defined, indicating that a question has not been answered, for example the question lifetime timeout can be set to one minute. If a question lifetime timeout occurs in step S23 then in step S24 the corresponding question is marked as not pending or is eleted and in the following step S25 an error message is output indicating that the answer is missing. The process ends in step S26. If in the later process the corresponding answer occurs very late then this answer is also marked as having no corresponding question due to the question lifetime timeout.

A further possibility is to set an ignore mode for polling messages. That is after a first unacknowledged polling message has been detected, following polling messages in a row are ignored. Hereby, polling messages in a row can refer to any type of polling messages in a row or can only refer to polling messages being addressed to the same address. For example if a first polling message is sent to the television and is not acknowledged, then the first polling message can be shown as unacknowledged and the following polling messages also sent to the television are ignored. An "ignore mode lifetime timeout" can be set in step. After a predefined time since the reception of the last unacknowledged polling message in a row the ignore mode can be cleared and from the on the first polling message which has not been acknowledged in a row is shown again. This is shown in FIG. 6. If the "Ignore mode lifetime timeout" is due in step S27, the ignore mode is cleared in step S28 and the process ends in step S29.

The whole process according to the second embodiment of the present invention is shown in FIG. 7. Hereby, the processes of FIG. 6a to 6c are either a part of the process of FIG. 7 or run in parallel to FIG. 7. The process starts in step S30 with the detection of a message, i.e. the listening unit 9 monitors a message and submits the monitored message to the processing unit 3.

In the next step S31 it is checked whether the detected message is an unacknowledged polling message. In case that the message is an unacknowledged polling message then in the following step S45 it is checked whether it is the first unacknowledged polling message in a row, i.e. whether it is the first unacknowledged polling messages in a row, e.g. the first unacknowledged polling message having the same addressee as a previous unacknowledged polling message, whereby in this case the ignore mode currently is not set.

If in step S45 it is determined that it was the first unacknowledged polling message in a row then now the ignore mode is set in step S46 and it is further set an "ignore mode lifetime timeout" in step S47 indicating when the ignore mode showed is supposed to end and in step S48 a place holder is inserted in the lines on the display lines indicating that a first unacknowledged polling message in a row has occurred.

Otherwise, if in step S45 it is detected that it was not the first unacknowledged polling message in a row and consequently the ignore mode is currently set, then in the following step S49 if the electronic device 1 is in the ignore mode then a new "ignore mode lifetime timeout" is set and in the following step S50 the unacknowledged polling messages during the ignore mode are not shown, i.e. are not output by the output means 2.

Going back to step S31, if it is determined that the monitored message was not an unacknowledged polling message, then in the following step S32 the type of message is determined. The type of message can either be a question, an answer or any other message which in the following is denominated neutral message. A neutral message can for example be an acknowledged polling message or a CEC standby message. A neutral message is output in step S33 by the output means 2 either by outputting the content of the message, e.g. "standby sent from device A to device B" or with the indication "neutral message" or the like, e.g. indicated by colour or style.

In case the message is a question, then the process continues with step S34 where the question is marked as pending. In the following step S35 the error timeout as previously explained is set and in the next step S36 the question lifetime timeout is also set as previously shown. In the next step S37 the question is output by the output means 2, i.e. in the present embodiment shown on the display. In case the question lifetime timeout ends then the question will be marked as unanswered and an according error message will be output as explained with reference to FIG. 6*b*.

If in step S32 it is determined that the message was an answer, then in the next step S38 it is checked whether the corresponding question does still exist, i.e. whether the corresponding question was cancelled due to a question lifetime timeout or not. If the corresponding question does still exist, then in the following step S39 the question is marked as answered and the corresponding error timeout is deleted. In the next step S41 the answer is shown and linked to the corresponding question, as will be explained later. In case that in step S42 it is determined that the time since the question is exceeding the error timeout then additionally a warning is shown indicating that the answer is later than the error timeout or the answer is marked in a specific way.

Otherwise, if in step S38 it is determined, that the corresponding question does not exist then the process continues with step S43. In case that the answer requires a corresponding question, then either the corresponding question was missing or has been cancelled due to a question lifetime timeout. In both cases the answer is shown without the question and together with an error message indicating that the question is missing. Otherwise the answer is shown without a question. There are for example CEC messages, which are valid on their own and which do not necessarily require a corresponding question, e.g. if a new device into the network the new device will broadcast "report physical address", the same message is also the answer to the question "give physical address".

In the next step S44 the corresponding answer together with eventual error messages is shown. The process in any case ends in step S51. If another message is detected by the listening unit 9, this process will start again with step S30.

As previously explained it is possible to output a question and answer and mark the question and answer as belonging together. This can for example be accomplished by marking question and answer belonging together in a specific colour on the display, so that the user when looking at the display at a first look due to the different colours recognises which answer belongs to which question.

Further the question and answer can be marked depending on the time between question and answer. For example, if less than fifty seconds have passed between question and answer, then the question and answer pair is marked green, in case that the time between fifty seconds and a minute has elapsed, then the question and answer pair is marked yellow and otherwise in case that more than one minute has elapsed the question and answer pair is marked red.

It is to be noted that the process as explained with reference to FIG. 7 is not limited to the described examples of marking the questions and answers. The question and answers can be marked by colouring the messages, by changing the size of the written commands on the display, by changing the position of the messages displayed by the output means 2, by formatting the question and answers in different ways, e.g. by underlining some messages or by writing some messages bold, or the like. Additionally in case of an unanswered question or an answer without corresponding question an additional signal or message can be output by the output means in order to mark the question as unanswered or in order to mark the answer as having no question.

It is to be noted that the present invention also encompasses the possibility, that polling messages are not shown at all and that only questions, answers and neutral messages are processed and shown as previously described with reference to FIG. 7. That means that step S31 can also be omitted and the corresponding following steps S45 to S50 can also be omitted.

In a further embodiment it is possible to output by the output means 2 additional messages or indications thereby enabling a better overview of the output messages. For example debug messages can be output between the monitored messages in order to describe the general field the following messages are related to.

For example if the user in one electronic device connected via the network 8 selects different options within a menu, this may result in messages transmitted over the network. In this case the listening unit 9 will monitor the respective messages and the processing unit 3 will recognise those messages as belonging to a specific menu option or action accomplished by the user. Before outputting the monitored messages the output means 2 can then output an additional message indicating that the specific action or menu selection has been accomplished by the user and that therefore the following messages probably will belong to this action.

If for example the user within the menu starts the digital auto tuning, then a debug message showing for example "auto tuning started" indicates that following messages can fall under this theme.

It is to be noted, that components, features or method steps described with respect to one embodiment can also be incorporated into another embodiment where appropriate.

With this method it is easier for the user or any other person to keep the overview on the messages sent over the network 8. The handling of the electronic device 1 and trouble shooting is therefore simplified. In the present first example there is provided a placeholder indicating that one or more messages were not shown. In the present second example pairs of questions and answers are distinguished based on the time between question and answer, and unanswered questions can also be marked. In further examples other filter criteria could be used, e.g. messages are shown or not shown or are shown in a specifically way depending on the sender, receiver, Opcode, directly addressed message, broadcasts and so on. For example only messages from or to a selected device may be shown.

According to the present invention the electronic device can be operated in different modes. The first mode is a passive mode, where only the listening unit 9 is activated and the electronic device listens to the traffic of the other devices within the network only. The other possibility is to provide the electronic device 1 in a normal CEC operation mode thereby showing all traffic including the own messages. When monitoring the messages over the network the electronic device 1 is able to send via the output means 2 all kinds of CEC commands.

The invention claimed is:
1. An electronic device comprising:
   a communication component connecting the electronic device to a network and for enabling communication of the electronic device within the network;
   a listening unit connected to the communication component for monitoring messages transmitted over the net- work and message traffic according to a consumer electronics control (CEC) standard;
a processing unit to determine a type of the monitored message; and
an output means for outputting at least a part of the monitored messages depending on the determined type,
wherein the communication component is a consumer electronics control (CEC) bus that enables communication via the consumer electronics control (CEC) standard,
the processing unit detects an unacknowledged polling message and determines whether the unacknowledged polling message is the first unacknowledged polling message in a row, and
the output means does not output the unacknowledged polling message when the unacknowledged polling message is not the first unacknowledged polling message in a row.

2. The device according to claim 1, wherein the output means is a display.

3. The device according to claim 1, wherein the output means is an interface enabling communication with a further remote device.

4. The device according to claim 1, wherein the output means outputs a placeholder when the unacknowledged polling message is the first unacknowledged polling message in a row.

5. The device according to claim 1, wherein the processing unit detects a question.

6. The device according to claim 5, wherein the processing unit defines a question lifetime timeout after which the output means marks the question as unanswered.

7. The device according to claim 6, wherein the output means outputs an error message when the question is marked as an unanswered question.

8. The device according to claim 1, wherein the processing unit detects an answer.

9. The device according to claim 8, wherein the processing unit detects whether the answer belongs to a previous question.

10. The device according to claim 9, wherein the output means marks the previous question and the answer as belonging together.

11. The device according to claim 10, wherein the output means marks belonging together questions and answers differently depending on the time passed between the previous question and the answer.

12. The device according to claim 9, wherein the processing unit detects the answer, and the answer does not have a corresponding question.

13. The device according to claim 12, wherein the output means marks the answer without the corresponding question and outputs an error message indicating that the answer has no corresponding question.

14. The device according to claim 1, wherein the listening unit does not transmit commands to the electronic device via the communication component.

15. A method for monitoring communication within a network, implemented as an electronic device connected to communication component that connects the electronic device to the network and enables communication via a consumer electronics control (CEC) standard, comprising:
providing a listening unit for monitoring messages transmitted over the network;
monitoring the communication transmitted over the network;
determining the type of monitored messages by a processing unit;
outputting by an output means at least a part of the monitored messages depending on the determined type;
detecting an unacknowledged polling message and determining whether the unacknowledged polling message is the first unacknowledged polling in a row, by the processing unit; and
not outputting, by the output means, the unacknowledged polling message when the unacknowledged polling message is not the first unacknowledged polling message in the row,
wherein the listening unit monitors message traffic according to the consumer electronics control (CEC) standard.

16. The method according to claim 15, further comprising:
outputting by the output means a placeholder when the unacknowledged polling message is the first unacknowledged polling message in the row.

17. The method according to claim 15, further comprising:
detecting by the processing unit a question.

18. The method according to claim 17, further comprising:
defining by the processing unit a question lifetime timeout after which the output means marks the question as unanswered.

19. The method according to claim 18, further comprising:
outputting by the output means an error message when the question is marked as an unanswered question.

20. The method according to claim 15, further comprising:
detecting by the processing unit an answer.

21. The method according to claim 20, further comprising:
detecting by the processing unit whether the answer belongs to a previous question.

22. The method according to claim 21, further comprising:
marking by the output means the previous question and the answer as belonging together.

23. The method according to claim 2, further comprising:
marking by the output means belonging together questions and answers differently depending on time passed between the previous question and the answer.

24. The method according to claim 21, further comprising:
detecting by the processing unit the answer,
wherein the answer does not have a corresponding question.

25. The method according to claim 24, further comprising:
marking by the output means the answer without the corresponding question and/or outputting by the output means an error message indicating that the answer has no corresponding question.

26. An electronic device comprising:
a communication component connecting the electronic device to a network and for enabling communication of the electronic device within the network;
a listening unit connected to the communication component for monitoring messages transmitted over the network and message traffic according to a consumer electronics control (CEC) standard;
a processing unit to determine a type of the monitored message; and
an output means for outputting at least a part of the monitored messages depending on the determined type,
wherein the communication component is a consumer electronics control (CEC) bus that enables communication via the consumer electronics control (CEC) standard,
the processing unit detects an answer and detects whether the answer belongs to a previous question, and the output means marks the previous question and the answer as belonging together and marks belonging together questions and answers differently depending on the time passed between the previous question and the answer.

* * * * *